(12) United States Patent
Teng et al.

(10) Patent No.: US 12,479,040 B2
(45) Date of Patent: Nov. 25, 2025

(54) RESISTANCE-WELDED ASSEMBLIES AND RESISTANCE WELDING METHODS

(71) Applicant: GM GLOBAL TECHNOLOGY OPERATIONS LLC, Detroit, MI (US)

(72) Inventors: Zhenke Teng, Troy, MI (US); Pei-Chung Wang, Troy, MI (US); Jason M Brown, Goodrich, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 770 days.

(21) Appl. No.: 17/648,040

(22) Filed: Jan. 14, 2022

(65) Prior Publication Data

US 2023/0226636 A1   Jul. 20, 2023

(51) Int. Cl.
- *B23K 11/11* (2006.01)
- *B23K 11/00* (2006.01)
- *B23K 11/18* (2006.01)
- *F16B 5/08* (2006.01)

(52) U.S. Cl.
CPC ......... *B23K 11/115* (2013.01); *B23K 11/0026* (2013.01); *B23K 11/185* (2013.01); *F16B 5/08* (2013.01)

(58) Field of Classification Search
CPC . B23K 11/115; B23K 11/0026; B23K 11/185; B23K 2103/10; F16B 5/08
USPC .......................................................... 219/52
See application file for complete search history.

(56) References Cited

U.S. PATENT DOCUMENTS

| | | | |
|---|---|---|---|
| 2015/0000956 A1* | 1/2015 | Spinella | B23K 11/20 219/78.16 |
| 2017/0282303 A1* | 10/2017 | Wang | B23K 35/0255 |
| 2019/0314915 A1* | 10/2019 | Wang | B23K 11/166 |
| 2020/0114459 A1* | 4/2020 | Haselhuhn | B23K 11/20 |

FOREIGN PATENT DOCUMENTS

DE   102014208706 A1   11/2015

\* cited by examiner

*Primary Examiner* — Steven W Crabb
*Assistant Examiner* — Dilnessa B Belay
(74) *Attorney, Agent, or Firm* — Ingrassia Fisher & Lorenz, LLP | IF&L

(57) ABSTRACT

Methods for resistance welding, resistance-welded assemblies, and vehicles including resistance-welded assemblies are provided. An exemplary resistance welding method includes compressing a workpiece stack-up with an interface material between first and second workpieces to squeeze a portion of the interface material to a reduced thickness. After compressing the workpiece stack-up, the first welding electrode contacts the first workpiece at an operating contact area between the first welding electrode and the first workpiece that is greater than an initial contact area. The method also includes passing an electrical current between the welding electrodes to form a molten weld pool within the workpieces, and ceasing the passing of the electrical current between the welding electrodes to allow the molten weld pool to solidify into a weld nugget that forms all or part of a weld joint between the workpieces.

20 Claims, 3 Drawing Sheets

RESISTANCE-WELDED ASSEMBLIES AND RESISTANCE WELDING METHODS

INTRODUCTION

The technical field of this disclosure relates generally to resistance welding and, more particularly, to resistance spot-welding or resistance seam-welding of a metal or metal alloy workpiece.

Resistance spot-welding and resistance seam-welding are processes used in a number of industries to join together two or more metal workpieces. The automotive industry, for instance, often uses resistance welding to join together metal workpieces during the manufacture of a vehicle door, hood, trunk lid, or lift gate, among other vehicle components. Multiple welds are typically made along a periphery of the metal workpieces or at some other location.

Resistance welding, in general, relies on the resistance to the flow of electric current through contacting metal workpieces and across their faying interface to generate heat. To carry out a resistance welding process, a pair of opposed welding electrodes is clamped at aligned spots on opposite sides of the metal workpieces at a weld site. An electrical current is then passed through the workpieces from one welding electrode to the other. Resistance to the flow of the electric current generates heat within the metal workpieces and at their faying interface. When the workpieces being resistance welded are aluminum or aluminum alloys, the heat generated at the faying interface typically initiates a molten weld pool that penetrates into the aluminum workpieces from the faying interface. Upon cessation of the current flow, the molten weld pool solidifies into a weld nugget that forms all or part of a weld joint. After the resistance welding process is completed, the welding electrodes are retracted from the workpiece surfaces and the resistance welding process is repeated at another weld site.

Typically, welding electrodes are copper, or have a copper surface that contacts the workpieces. Workpieces of aluminum produce a small amount of heat and diffuse generated heat to a large extent because they have a small specific resistance and a large thermal conductivity. Therefore, to resistance weld aluminum workpieces, it is necessary to supply a large welding current to the aluminum workpieces in order to generate a sufficient amount of heat.

However, a large welding current may cause the surfaces of the aluminum workpieces in contact with the electrodes to produce a large amount of heat and form an alloy of copper and aluminum at the tip ends of the electrodes. The electrodes that are alloyed with aluminum have a reduced service life.

Further, the formation of the alloy of copper and aluminum may cause the electrodes to stick to the workpieces, known as "electrode sticking". In addition to shortening the service life of the electrodes, electrode sticking can cause damage to the robotic machinery that attempts to separate the electrodes from the workpieces after the welding process is completed, or distort the welded workpieces themselves.

Accordingly, it is desirable to provide a method for resistance welding that reduces alloy formation between the electrode and workpiece and/or reduces electrode sticking. Furthermore, other desirable features and characteristics will become apparent from the subsequent detailed description and the appended claims, taken in conjunction with the accompanying drawings and the foregoing technical field and background.

SUMMARY

Methods for resistance welding, resistance-welded assemblies, and vehicles including resistance-welded assemblies are provided.

A method for resistance welding includes providing a workpiece stack-up including a first workpiece, a second workpiece, and an interface material having an initial thickness and located between the first workpiece and the second workpiece. The method further includes bringing a first welding electrode into contact with the first workpiece at an initial contact area and bringing a second welding electrode into contact with the second workpiece. Also, the method includes compressing the workpiece stack-up with the first welding electrode and the second welding electrode to squeeze a squeezed portion of the interface material to a reduced thickness less than the initial thickness. After compressing the workpiece stack-up, the first welding electrode contacts the first workpiece at an operating contact area between the first welding electrode and the first workpiece that is greater than the initial contact area. The method also includes passing an electrical current between the first welding electrode and the second welding electrode to form a molten weld pool within the first workpiece and the second workpiece. Further, the method includes ceasing the passing of the electrical current between the first welding electrode and the second welding electrode to allow the molten weld pool to solidify into a weld nugget that forms all or part of a weld joint between the first workpiece and the second workpiece.

In certain embodiments, the interface material has a flexural modulus of from $1.5 \times 10^5$ to $5 \times 10^5$ psi. In certain embodiments, the interface material has a flexural strength of from 5,000 to 15,000 psi. In certain embodiments, the interface material has a resistivity of at least 10 $\mu\Omega \cdot cm$.

In certain embodiments, the interface material has an initial thickness of from about 0.025 mm to about 5 mm, and each workpiece has a thickness of less than about 3 mm.

In certain embodiments, each workpiece is aluminum or an aluminum alloy and the interface material has a melting point of about 660° C. or less.

In certain embodiments, the reduced thickness is near zero, such as on the order of microns.

In certain embodiments, after compressing the workpiece stack-up, a remaining portion of the interface material has a remaining thickness greater than or equal to the initial thickness. In such embodiments, the remaining thickness is greater than the initial thickness.

In certain embodiments, the second welding electrode is brought into contact with the second workpiece at a second initial contact area, and after compressing the workpiece stack-up with the first welding electrode and the second welding electrode, the second welding electrode contacts the second workpiece at a second operating contact area between the second welding electrode and the second workpiece that is greater than the second initial contact area.

In certain embodiments, the first welding electrode has an end with a distal region at a maximum electrode height and a surrounding region at a decreased electrode height less than the maximum electrode height, and, after compressing the workpiece stack-up with the first welding electrode and the second welding electrode, a minimum distance between the first welding electrode and the second welding electrode is defined along a line to the distal region, and the squeezed portion of the interface material surrounds the line.

In certain embodiments, each welding electrode has an end with a distal region at a maximum electrode height and a surrounding region at a decreased electrode height less than the maximum electrode height; the second welding electrode is brought into contact with the second workpiece at a second initial contact area; after bringing the first welding electrode into contact with the first workpiece at an initial contact area and the second welding electrode into contact with the second workpiece at a second initial contact area, a minimum initial distance between the first welding electrode and the second welding electrode is defined along a line between the distal region of each welding electrode; after compressing the workpiece stack-up with the first welding electrode and the second welding electrode, the second welding electrode contacts the second workpiece at a second operating contact area between the second welding electrode and the second workpiece that is greater than the second initial contact area and a minimum operating distance between the first welding electrode and the second welding electrode is defined along the line between the distal region of each welding electrode; and the squeezed portion of the interface material surrounds the line. In such embodiments, each welding electrode may have a dome-shaped end.

In another embodiment, a resistance-welded metal assembly is provided. The resistance-welded metal assembly includes a first workpiece comprised of a metal or metal alloy; a second workpiece comprised of a metal or metal alloy; a weld nugget formed from the first workpiece and the second workpiece, wherein the weld nugget forms all or part of a weld joint between the first workpiece and the second workpiece; and an interface material surrounding the weld nugget at an interface between the first workpiece and the second workpiece.

In certain embodiments, the interface material has a flexural modulus of from $1.5 \times 10^5$ to $5 \times 10^5$ psi. In certain embodiments, the interface material has a flexural strength of from 5,000 to 15,000 psi. In certain embodiments, the interface material has a resistivity of at least 10 $\mu\Omega\cdot$cm. In certain embodiments, each workpiece has a thickness of less than about 3 mm. In certain embodiments, each workpiece is aluminum or an aluminum alloy and wherein the interface material has a melting point of about 660° C. or less.

In another embodiment, a vehicle is provided. The vehicle includes a resistance-welded metal assembly including a first workpiece comprised of a metal or metal alloy; a second workpiece comprised of a metal or metal alloy; a weld nugget formed from the first workpiece and the second workpiece, wherein the weld nugget forms all or part of a weld joint between the first workpiece and the second workpiece; and an interface material located adjacent to the weld nugget at an interface between the first workpiece and the second workpiece, wherein the interface material has a flexural modulus of from $1.5 \times 10^5$ to $5 \times 10^5$ psi and a flexural strength of from 5,000 to 15,000 psi.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
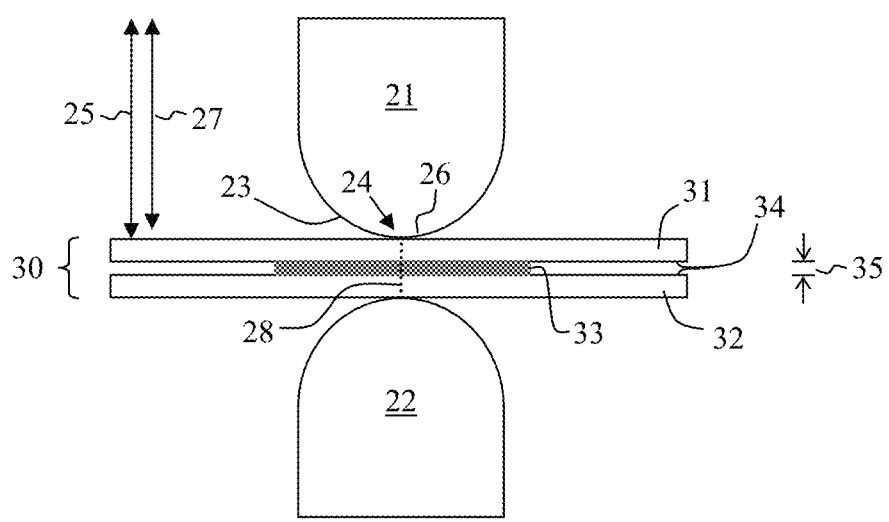
FIG. 1 is a schematic of an initial stage in a method for resistance welding workpieces in accordance with an embodiment.

The following detailed description is merely exemplary in nature and is not intended to limit the application and uses. Furthermore, there is no intention to be bound by any expressed or implied theory presented in the preceding technical field, background, brief summary or the following detailed description.

As used herein, the word "exemplary" means "serving as an example, instance, or illustration". As used herein, "a," "an," or "the" means one or more unless otherwise specified. The term "or" can be conjunctive or disjunctive. Open terms such as "include," "including," "contain," "containing" and the like mean "comprising", but in certain embodiments may mean "consisting of". In certain embodiments, numbers in this description indicating amounts, ratios of materials, physical properties of materials, and/or use are may be understood as being modified by the word "about". The term "about" as used in connection with a numerical value and the claims denotes an interval of accuracy, familiar and acceptable to a person skilled in the art. In general, such interval of accuracy is ±10%. All numbers in this description indicating amounts, ratios of materials, physical properties of materials, and/or use may be understood as modified by the word "about," except as otherwise explicitly indicated.

The figures are in simplified schematic form and are not to precise scale. Further, terms such as "upper", "lower", "above," "over," "below," "under," "upward," "downward," et cetera, are used descriptively of the figures, and do not represent limitations on the scope of the subject matter, as defined by the appended claims. Any numerical designations, such as "first" or "second" are illustrative only and are not intended to limit the scope of the subject matter in any way. It is noted that while embodiments may be described herein with respect to automotive applications, those skilled in the art will recognize their broader applicability.

Embodiments herein are related to resistance welding, such as to resistance spot-welding and resistance seam-welding of metal or metal alloy components. While specific embodiments are described herein including aluminum or aluminum alloy workpieces and copper welding electrodes, such descriptions are not limiting. Workpieces and welding electrodes of other metals or metal alloys are contemplated. In particular, magnesium and magnesium alloy workpieces are contemplated. As used herein a "metal" workpiece or a workpiece comprised of the "metal or metal alloy", refers to such workpieces that are at least 10 wt. % of the named metal. In certain embodiments, such workpieces are at least 25 wt. %, such as at least 50 wt. %, for example at least 75 wt. %, such as at least 80 wt. %, for example at least 95 wt. % of the named metal.

Embodiments herein provide for resistance welding while mitigating formation of alloys between the welding electrodes and the workpieces. In certain embodiments, the current density at the contact area between the welding electrodes and the workpieces is reduced, not by decreasing the applied current, but by increasing the contact area. Specifically, embodiments herein provide for deforming or deflecting the workpieces around the welding electrodes to increase the contact area therebetween. Because the current density at the contact areas is reduced, the localized heating of the contact area is reduced, and alloy formation between the welding electrodes and the workpieces at the contact area is reduced.

Referring now to FIGS. 1-9, a method is described herein for resistance welding workpieces with welding electrodes while mitigating formation of alloys between the welding electrodes and the workpieces, such as, in certain embodiments, mitigating formation of copper-aluminum alloys from copper electrodes and aluminum workpieces.

As shown in FIG. 1, two opposed welding electrodes 21 and 22 are provided. Each welding electrode 21 and 22 has a domed or dome-shaped end 23. It is noted that welding electrodes 21 and 22 may not be identical. Further, it is noted that either or both of welding electrodes 21 and 22 may not have a domed end 23, such that other geometries are contemplated for welding electrodes 21 and 22.

In FIG. 1, the end 23 of each welding electrode 21 and 22 has a crown or distal region 24, at a maximum electrode height 25, and a surrounding region 26, with a decreased electrode height 27 less than the maximum electrode height 25. In the illustrated embodiment, the distal region 24 is circular and the surrounding region 26 is annular and completely surrounds the distal region 24.

As shown in FIG. 1, a workpiece stack-up 30 is provided. The exemplary workpiece stack-up 30 includes a first workpiece 31, a second workpiece 32, and an interface material 33. Exemplary workpieces 31 and 32 are metal or metal alloys, such as aluminum, aluminum alloy, magnesium, magnesium alloys, or other suitable metals. For example, workpieces 31 and 32 may be 5000, 6000, or 7000 series cast or extruded aluminum alloys suitable for automotive use.

In exemplary embodiments, each workpiece 31 and 32 has a thickness of less than 3 mm, such as less than 2 mm, for example less than 1.8 mm, or less than 1 mm, and a thickness greater than 0.1 mm, such as greater than 0.25 mm, or greater than 0.5 mm. As described below, exemplary workpieces 31 and 32 are thin enough to be deformed by the resistance welding method.

The interface material 33 is located between the faying surfaces 34 of the workpieces 31 and 32. As shown, the interface material 33 has an initial thickness 35. In exemplary embodiments, the interface material 33 has an initial thickness 35 of from 0.025 mm to 5 mm, such as from 0.05 mm to 2 mm. In an exemplary embodiment, the interface material 33 is compressible and flowable under compression. For example, the interface material 33 may be a polymeric material (e.g., adhesive or sealer) or a similar material.

An exemplary interface material 33 has a flexural modulus of from $1.5 \times 10^5$ to $5 \times 10^5$ psi, as measured according to ASTM D790, ISO 178, or ASTM E290.

An exemplary interface material 33 has a flexural strength of from 5,000 to 15,000 psi, as measured according to ASTM D790 or ASTM E290.

An exemplary interface material 33 has a resistivity of at least 10 μΩ·cm, as measured according to ASTM D257 or ASTM B193-20.

An exemplary interface material 33 has a melting point (or decomposition temperature) of 660° C. or less, such as for use with aluminum or aluminum alloy workpieces. The interface material 33 may be selected based on its melting point (or decomposition temperature) in view of the type of metal or metal alloy workpieces being resistance-welded.

In FIG. 1, the first welding electrode 21 and the second welding electrode 22 are illustrated after having been brought into contact with the workpiece stack-up 30. When brought into contact with the workpiece stack-up 30, a minimum initial distance between the first welding electrode and the second welding electrode is defined along a line 28 to, and between, each distal region 24. The minimum initial distance 28 may be equal to a thickness of the workpiece stack-up 30, i.e., equal to the sum of thicknesses of the workpieces 31 and 32 and the interface material 33.

Figure 2:
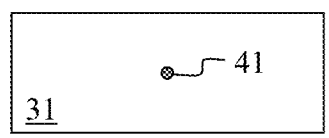
FIGS. 2 and 3 are plan views of the faying surfaces of the workpieces of FIG. 1 illustrating initial contact areas in accordance with an embodiment.
Figure 3:
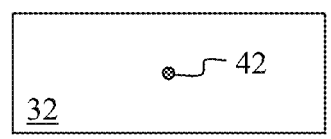

Cross-referencing FIG. 1 with FIGS. 2 and 3, which are plan views of the faying surfaces 34 of the workpieces 31 and 32, it can be seen that the first welding electrode 21 is brought into contact with the first workpiece 31 at an initial contact area 41 and the second welding electrode 22 is brought into contact with the second workpiece 32 at an initial contact area 42. It is contemplated that the initial contact areas 41 and 42 are equal to and coterminous with the distal regions 24 of each welding electrode 21 and 22.

Figure 4:
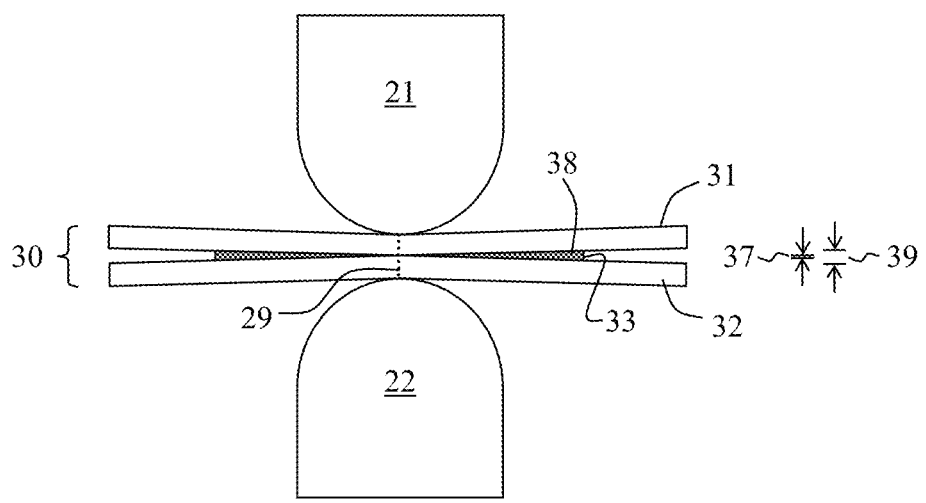
FIG. 4 is a schematic of a compressing stage in a method for resistance welding workpieces in accordance with an embodiment.

Referring now to FIG. 4, the method continues with compressing the workpiece stack-up 30 with the first welding electrode 21 and the second welding electrode 22. Specifically, at least one welding electrode 21 or 22 is moved toward the other welding electrode 22 or 21, or both welding electrodes 21 and 22 are moved toward one another.

When compressing the workpiece stack-up 30 with the welding electrodes 21 and 22, a portion of the interface material 33 is compressed to a reduced thickness 37. In certain embodiments, the reduced thickness 37 may be near zero.

As shown, after compressing the workpiece stack-up 30 with the first welding electrode 21 and the second welding electrode 22, a minimum operating distance between the first welding electrode 21 and the second welding electrode 22 is defined along the line 29 between the distal regions 24 of each welding electrode 21 and 22. The minimum operating distance 29 may be equal to the total thickness of the workpieces 31 and 32, or to the total thickness of the workpieces 31 and 32 and a reduced thickness 37 of the interface material 33.

Figure 5:
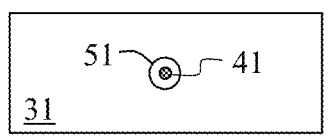
FIGS. 5 and 6 are plan views of the faying surfaces of the workpieces of FIG. 4 illustrating operating contact areas in accordance with an embodiment.
Figure 6:
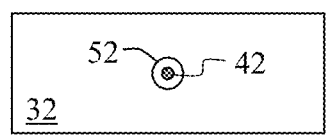
Figure 7:
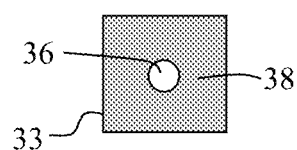
FIG. 7 is a plan view of an interface material between the workpieces of FIG. 4 illustrating a region of reduced thickness in accordance with an embodiment.

Cross-referencing FIG. 4 with FIGS. 5, 6, and 7 may provide a clearer understanding of the structural results of the compression of the workpiece stack-up 30. FIGS. 5 and 6 are plan views of the faying surfaces 34 of the workpieces 31 and 32. FIG. 7 is a plan view of the interface material 33.

After compressing the workpiece stack-up 30 with the welding electrodes 21 and 22, each welding electrode 21 and 22 contacts the respective workpiece 31 and 32 at an operating contact area 51 and 52 between the respective welding electrode and the workpiece that is greater than the respective initial contact area 41 and 42. It is contemplated that the operating contact areas 51 and 52 are equal to and coterminous with the area of the surrounding regions 26 of each welding electrode 21 and 22 (identified in FIG. 1).

As shown in FIG. 4, to increase the contact area between each workpiece and the respective welding electrode, each workpiece is deformed or deflected. It is noted that the Figures are not drawn to scale, and that the deflection of the workpieces is exaggerated to provide understanding. Nevertheless, the deflection of the workpieces around the welding electrodes provides for an increase in contact area between the workpieces and welding electrodes.

As shown in FIG. 7, as a result of compressing the workpiece stack-up 30, a portion 36 of the interface material 33 is squeezed to the reduced thickness 37 (shown in FIG. 4) less than the initial thickness 35 (shown in FIG. 1). In certain embodiments, the reduced thickness 37 may be near zero, such as at a micron level.

The squeezed portion 36 of the interface material 33 surrounds the line 29 indicating the minimum operating distance. Accordingly, during the compression process, interface material 33 is forced radially outward, in the volume between the workpieces 31 and 32. For example, a remaining portion 38 of the interface material 33 is forced radially away from the line 29. In exemplary embodiments, the remaining portion 38 of the interface material 33 is annular and surrounds the squeezed portion 36. As shown in FIG. 4, the remaining portion 38 of the interface material 33 has a remaining thickness 39 greater than or equal to the initial thickness 35. Specifically, as interface material 33 moves radially outward, the amount of interface material 33 in a selected location may be increased as compared to the initial amount as shown in FIG. 1.

Figure 8:
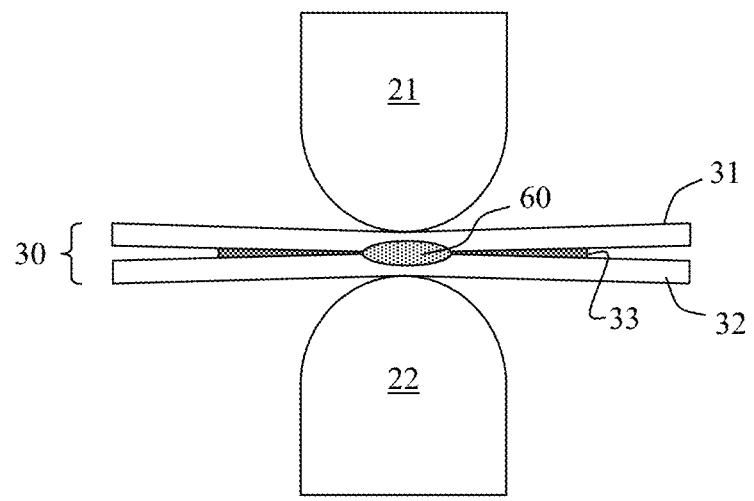
FIG. 8 is a schematic of a melting stage in a method for resistance welding workpieces in accordance with an embodiment.

As shown in FIG. 8, after compressing the workpiece stack-up, the method continues with passing an electrical current between the first welding electrode 21 and the second welding electrode 22. As a result, a molten weld pool 60 is formed within the first workpiece 31 and the second workpiece 32 is formed due to heating caused by resistance to the electrical current.

Figure 9:
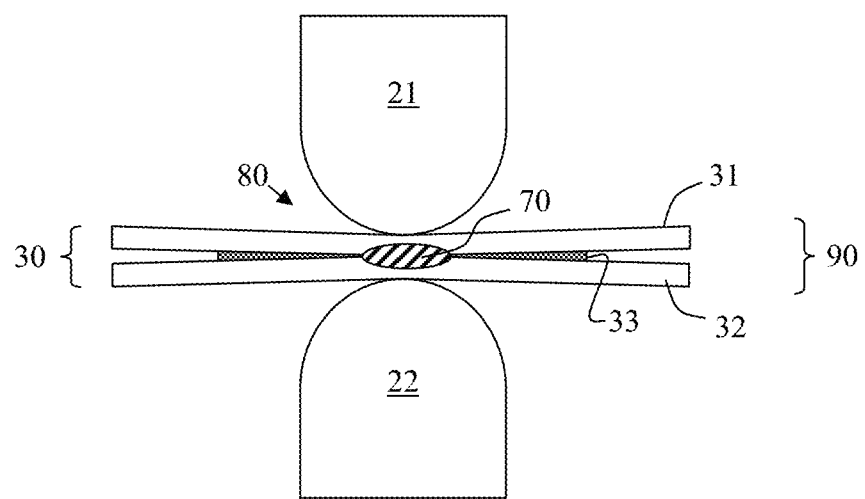
FIG. 9 is a schematic of a cooling stage in a method for resistance welding workpieces in accordance with an embodiment.

As shown in FIG. 9, after forming the molten weld pool 60, the method continues with ceasing the passing of the electrical current between the first welding electrode 21 and the second welding electrode 22 to allow the molten weld pool to cool to solidify into a weld nugget 70 that forms all or part of a weld joint 80 between the first workpiece 31 and the second workpiece 32.

As a result, a resistance-welded assembly 90 is formed by the method and includes the first workpiece 31 comprised of a metal or metal alloy, the second workpiece comprised of a same or different metal or metal alloy, the weld nugget 70 formed from the first workpiece 31 and the second workpiece 32, and the interface material 33 surrounding the weld nugget 70 at the interface between the first workpiece 31 and the second workpiece 32. In the resistance-welded assembly 90, the weld nugget 70 forms all or part of a weld joint between the first workpiece and the second workpiece.

As disclosed herein, the resistance-welded assembly 90 may form an automotive vehicle component, such as a vehicle door, hood, trunk lid, lift gate, or other body part. Therefore, in an embodiment herein a vehicle is provided and includes a resistance-welded metal assembly comprising: a first workpiece comprised of a metal or metal alloy; a second workpiece comprised of a same or different metal or metal alloy; a weld nugget formed from the first workpiece and the second workpiece, wherein the weld nugget forms all or part of a weld joint between the first workpiece and the second workpiece; and an interface material located adjacent to the weld nugget at an interface between the first workpiece and the second workpiece, wherein the interface material has a flexural modulus of from $1.5 \times 10^5$ to $5 \times 10^5$ psi and a flexural strength of from 5,000 to 15,000 psi.

As described, the method of FIGS. 1-9 provides for increasing the contact area between the welding electrodes 21 and 22 and the workpieces 31 and 32 by physically deflecting or deforming the workpieces 31 and 32. Specifically, the presence of the compressible interface material 33 between the workpieces 31 and 32 allows for the reduction of the distance between the welding electrodes along the line of the electrodes' closest contact points, by allowing for the reduction of the distance between the workpieces at that location. At the same time, the compressible interface material 33 prevents the reduction of the distance between the workpieces at locations radially outward from the line of electrodes' closest contact points. In other words, the presence of the compressible interface material causes the workpieces to be deflected under the application of compression forces by the electrodes.

Further, as a result of the increased contact area between the welding electrodes 21 and 22 and the workpieces 31 and 32, the current density at the contact area is reduced. With a reduction in current density, extreme localized heating at the contact area is also reduced, and the formation of alloys of the welding electrode and workpiece metals, such as for example copper-aluminum alloys, is prevented or mitigated.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for resistance welding, the method comprising:

providing a workpiece stack-up including a first workpiece, a second workpiece, and an interface material located between the first workpiece and the second workpiece, wherein each workpiece has a thickness of less than about 3 mm and each workpiece is aluminum or an aluminum alloy, wherein the interface material has an initial thickness and wherein the interface material is a polymeric material, has a flexural modulus of from $1.5 \times 10^5$ to $5 \times 10^5$ psi, has a flexural strength of from 5,000 to 15,000 psi, has a resistivity of at least 10 $\mu\Omega \cdot cm$, and has a melting point of about 660° C. or less;

bringing a first welding electrode into contact with the first workpiece at an initial contact area and bringing a second welding electrode into contact with the second workpiece;

compressing the workpiece stack-up with the first welding electrode and the second welding electrode to squeeze a squeezed portion of the interface material to a reduced thickness less than the initial thickness, wherein, after compressing the workpiece stack-up, the first welding electrode contacts the first workpiece at an operating contact area between the first welding electrode and the first workpiece that is greater than the initial contact area;

passing an electrical current between the first welding electrode and the second welding electrode to form a molten weld pool within the first workpiece and the second workpiece; and ceasing the passing of the electrical current between the first welding electrode and the second welding electrode to allow the molten weld pool to solidify into a weld nugget that forms all or part of a weld joint between the first workpiece and the second workpiece.

2. The method of claim 1, wherein:
after bringing the first welding electrode into contact with the first workpiece at the initial contact area and bringing the second welding electrode into contact with the second workpiece, a minimum initial distance between the first welding electrode and the second welding electrode is defined along a line;
before compressing the workpiece stack-up, the interface material extends outward in a radial direction from the line to an edge, the interface material terminates in the radial direction at the edge, and the interface material has the initial thickness at the edge; and
compressing the workpiece stack-up causes the interface material to move radially outward to provide the interface material with an increased thickness at the edge, wherein the interface material terminates in the radial direction at the edge, and wherein the increased thickness is greater than the initial thickness.

3. The method of claim 1, wherein:
after bringing the first welding electrode into contact with the first workpiece at the initial contact area and bringing the second welding electrode into contact with the second workpiece, a minimum initial distance between the first welding electrode and the second welding electrode is defined along a line;
before compressing the workpiece stack-up, the interface material extends outward in a radial direction from the line to an edge, the interface material terminates in the radial direction at the edge, and the interface material has the initial thickness at the edge; and
after ceasing the passing of the electrical current between the first welding electrode and the second welding electrode to allow the molten weld pool to solidify into the weld nugget, the interface material terminates in the radial direction at the edge and the interface material has a maximum thickness at the edge, wherein the maximum thickness is greater than the initial thickness.

4. A method for resistance welding, the method comprising:
providing a workpiece stack-up including a first workpiece, a second workpiece, and an interface material located between the first workpiece and the second workpiece, wherein the interface material has an initial thickness and wherein the interface material is a polymeric material;
bringing a first welding electrode into contact with the first workpiece at an initial contact area and bringing a second welding electrode into contact with the second workpiece;
compressing the workpiece stack-up with the first welding electrode and the second welding electrode to squeeze a squeezed portion of the interface material to a reduced thickness less than the initial thickness, wherein, after compressing the workpiece stack-up, the first welding electrode contacts the first workpiece at an operating contact area between the first welding electrode and the first workpiece that is greater than the initial contact area;
passing an electrical current between the first welding electrode and the second welding electrode to form a molten weld pool within the first workpiece and the second workpiece; and
ceasing the passing of the electrical current between the first welding electrode and the second welding electrode to allow the molten weld pool to solidify into a weld nugget that forms all or part of a weld joint between the first workpiece and the second workpiece, wherein:
before compressing the workpiece stack-up, the interface material contacts the first workpiece along a first faying surface of the first workpiece;
before compressing the workpiece stack-up, the interface material contacts the second workpiece along a second faying surface of the second workpiece parallel to the first faying surface; and
after ceasing the passing of the electrical current between the first welding electrode and the second welding electrode to allow the molten weld pool to solidify into the weld nugget, the first faying surface and the second faying surface are deflected away from one another.

5. The method of claim 4, wherein before compressing the workpiece stack-up:
the interface material contacts the first workpiece along a first surface of the interface material;
the interface material contacts the second workpiece along a second surface of the interface material;
the first surface of the interface material extends from a first edge to a second edge;
the first surface is in continuous contact with the first workpiece from the first edge to the second edge;
the second surface of the interface material extends from the first edge to the second edge; and
the second surface is in continuous contact with the second workpiece from the first edge to the second edge.

6. The method of claim 5, wherein before compressing the workpiece stack-up:
the first surface of the interface material is planar; and
the second surface of the interface material is planar.

7. The method of claim 6, wherein after compressing the workpiece stack-up with the first welding electrode and the second welding electrode:
the first surface of the interface material is non-planar; and
the second surface of the interface material is non-planar.

8. The method of claim 7, wherein after compressing the workpiece stack-up with the first welding electrode and the second welding electrode:
the first surface is not in continuous contact with the first workpiece from the first edge to the second edge;
the second surface is not in continuous contact with the second workpiece from the first edge to the second edge.

9. The method of claim 8, wherein after compressing the workpiece stack-up with the first welding electrode and the second welding electrode:
the first surface contacts the first workpiece at the first edge;
the first surface contacts the first workpiece at the second edge;
the second surface contacts the second workpiece at the first edge; and
the second surface contacts the second workpiece at the second edge.

10. The method of claim 9, wherein compressing the workpiece stack-up with the first welding electrode and the second welding electrode comprises:
moving the squeezed portion of the interface material radially-outward from the line.

11. The method of claim 10, wherein the weld nugget contacts and is distinct from the interface material.

12. The method of claim 11, wherein the weld nugget contacts the interface material continuously along an annular interface.

13. The method of claim 1, wherein:
before compressing the workpiece stack-up, the interface material has an annular periphery, a first surface, and a second surface;
before compressing the workpiece stack-up, the annular periphery is in continuous contact with the first workpiece and with the second workpiece, the first surface is in continuous contact with the first workpiece, and the second surface is in continuous contact with the second workpiece; and
after forming the weld nugget, the weld nugget contacts the interface material continuously along an annular interface, the first surface contacts the first workpiece continuously from the annular interface to the annular periphery, and the second surface contacts the second workpiece continuously from the annular interface to the annular periphery.

14. The method of claim 13, wherein:
before compressing the workpiece stack-up, the annular periphery has the initial thickness; and
after forming the weld nugget, the annular periphery has an increased thickness greater than the initial thickness.

15. The method of claim 14, wherein compressing the workpiece stack-up with the first welding electrode and the second welding electrode comprises:
contacting the first workpiece and the second workpiece at a contact location; and
moving the squeezed portion of the interface material radially-outward from the contact location.

16. The method of claim 14, wherein the interface material terminates at the annular periphery.

17. The method of claim 15, wherein a thickness of the interface material increases continuously from a minimum thickness adjacent to the weld nugget to the increased thickness.

18. A method for resistance welding, the method comprising:
providing a workpiece stack-up including a first workpiece, a second workpiece, and an interface material located between the first workpiece and the second workpiece, wherein the interface material has an initial thickness and wherein the interface material is a polymeric material;
bringing a first welding electrode into contact with the first workpiece at an initial contact area and bringing a second welding electrode into contact with the second workpiece;
compressing the workpiece stack-up with the first welding electrode and the second welding electrode to squeeze a squeezed portion of the interface material to a reduced thickness less than the initial thickness, wherein, after compressing the workpiece stack-up, the first welding electrode contacts the first workpiece at an operating contact area between the first welding electrode and the first workpiece that is greater than the initial contact area;
passing an electrical current between the first welding electrode and the second welding electrode to form a molten weld pool within the first workpiece and the second workpiece; and
ceasing the passing of the electrical current between the first welding electrode and the second welding electrode to allow the molten weld pool to solidify into a weld nugget that forms all or part of a weld joint between the first workpiece and the second workpiece, wherein:
the interface material extends radially outward to an annular periphery where the interface material ends;
before compressing the workpiece stack-up, the annular periphery has the initial thickness;
after forming the weld nugget, the interface material has a maximum thickness at the annular periphery; and
the maximum thickness is greater than the initial thickness.

19. The method of claim 18, wherein:
before compressing the workpiece stack-up, the interface material has an annular periphery, a first surface, and a second surface, wherein the first surface and second surface are parallel, and wherein a vertical plane is perpendicular to the first surface and the second surface;
before compressing the workpiece stack-up, the annular periphery is in continuous contact with the first workpiece and with the second workpiece, the first surface is in continuous contact with the first workpiece, and the second surface is in continuous contact with the second workpiece; and
after forming the weld nugget, the weld nugget contacts the interface material continuously along an annular interface, the first surface contacts the first workpiece continuously along a first interface from the annular interface to the annular periphery, the second surface contacts the second workpiece continuously along a second interface from the annular interface to the annular periphery, in a cross section along the vertical plane the first surface is linear and the second surface is linear.

20. The method of claim 18, wherein the interface material has a flexural modulus of from $1.5 \times 10^5$ to $5 \times 10^5$ psi, wherein the interface material has a flexural strength of from 5,000 to 15,000 psi, and wherein the interface material has a resistivity of at least 10 µΩ·cm, wherein each workpiece has a thickness of less than about 3 mm, and wherein each workpiece is aluminum or an aluminum alloy and wherein the interface material has a melting point of about 660° C. or less.

* * * * *